(12) United States Patent
Raichelgauz

(10) Patent No.: US 12,709,297 B2
(45) Date of Patent: Aug. 18, 2026

(54) PREDICTING AI MODELS FOR AUTONOMOUS DRIVING PER ROAD SEGMENT

(71) Applicant: AUTOBRAINS TECHNOLOGIES LTD, Tel Aviv-Jaffa (IL)

(72) Inventor: Igal Raichelgauz, Tel Aviv (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 44 days.

(21) Appl. No.: 18/914,932

(22) Filed: Oct. 14, 2024

(65) Prior Publication Data

US 2026/0103217 A1 Apr. 16, 2026

Related U.S. Application Data

(63) Continuation of application No. 18/914,860, filed on Oct. 14, 2024.

(51) Int. Cl.
*B60W 60/00* (2020.01)
*G05B 13/02* (2006.01)

(52) U.S. Cl.
CPC ..... *B60W 60/0011* (2020.02); *G05B 13/0265* (2013.01)

(58) Field of Classification Search
CPC ........................ B60W 60/0011; G05B 13/0265
See application file for complete search history.

(56) References Cited

U.S. PATENT DOCUMENTS

2021/0191407 A1* 6/2021 Benisch ............... G05D 1/0221
2024/0219198 A1* 7/2024 Beisel ................ G01C 21/3881

* cited by examiner

*Primary Examiner* — Navid Z. Mehdizadeh
*Assistant Examiner* — Matthew Ho
(74) *Attorney, Agent, or Firm* — RECHES PATENTS

(57) ABSTRACT

A method of predictability of artificial intelligence models for activation using localization, the method includes: (a) obtaining, by a computerized system of a vehicle, cross-statistical data, (b) analyzing, the cross-statistical data with respect to one or more first artificial intelligence models of the first set currently activated in association with the first road segment; and (c) predicting, based on analysis of the cross-statistical data, an artificial intelligence model for activation in a driving of the vehicle when approaching the second road segment. The artificial intelligence models of the first set and of the second set are trained each, in a scenario-level learning, and further, by collecting special-purpose data relating directly to a specified road segment indication and reflecting behavioral data of drivers captured along a specified road segment.

18 Claims, 9 Drawing Sheets

Computerized system 400

| DS1 AI-model | Response tuned to road road segments ….. | Response not tuned to road road segments ….. |
|---|---|---|
| DS2 AI-model | Response tuned to road road segments ….. | Response not tuned to road road segments ….. |
| ⋮ | | ⋮ |
| DSx AI-model | Response tuned to road road segments ….. | Response not tuned to road road segments ….. |

Table 600

Figure 5:
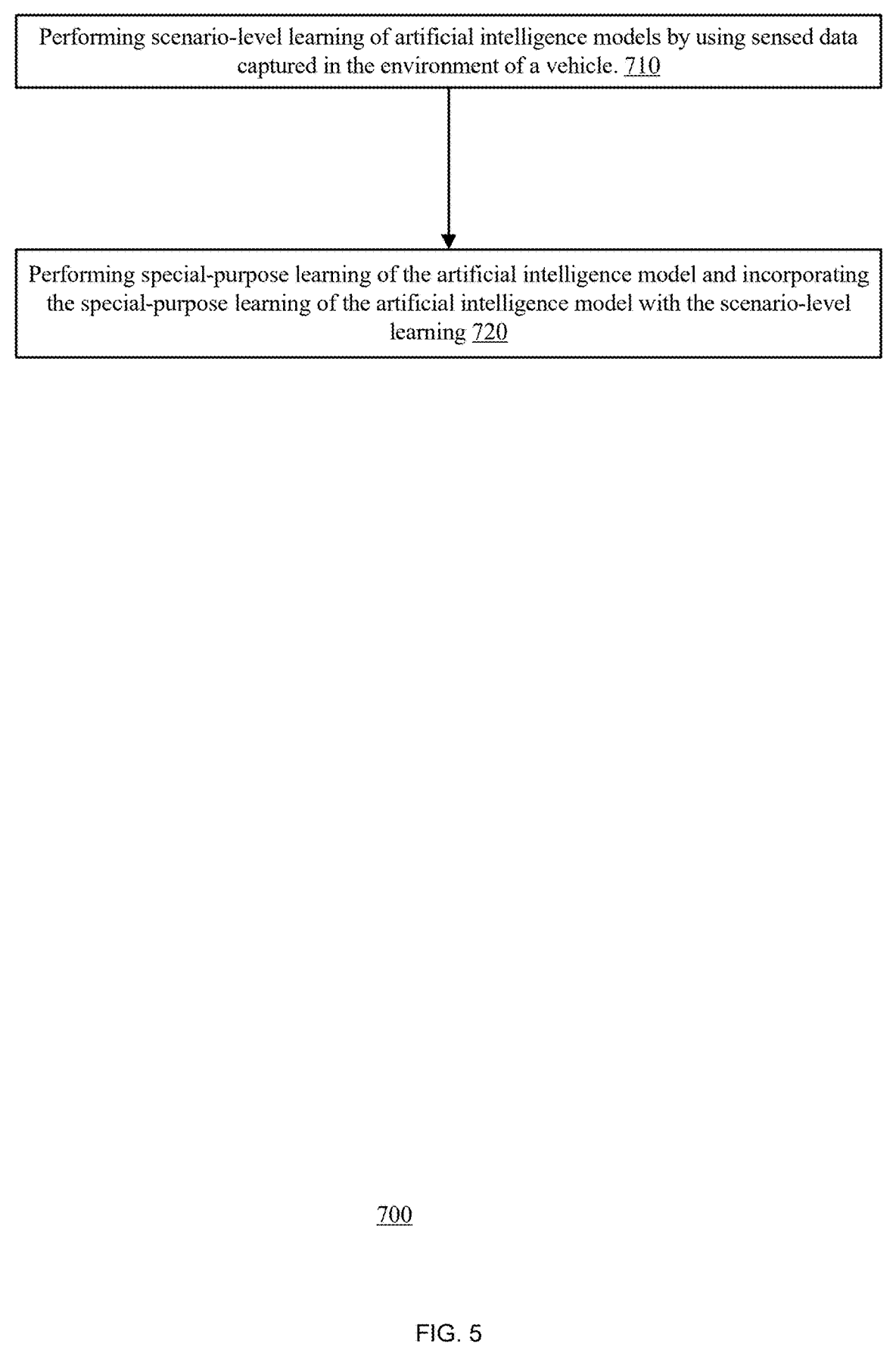

Performing scenario-level learning of artificial intelligence models by using sensed data captured in the environment of a vehicle. 710

Performing special-purpose learning of the artificial intelligence model and incorporating the special-purpose learning of the artificial intelligence model with the scenario-level learning 720

| Activated AI-model of one road segment | Cross-statistical data |
|---|---|
| DS1 AI-model | 90% of activating DS2 AI-model following an activation of DS1 AI-model |

| | |
|---|---|
| DS2 AI-model | 60% of activating DS4 AI-model following an activation of DS2 AI-model |
| | 40% of activating DS6 AI-model following an activation of DS2 AI-model |

Table 601

PREDICTING AI MODELS FOR AUTONOMOUS DRIVING PER ROAD SEGMENT

BACKGROUND

Artificial intelligence agents are used in autonomous vehicles.

There is a growing need to improve the utilization of Artificial intelligence agents.

SUMMARY

There is provided a method, a non-transitory computer readable medium and a system as illustrated in the application.

BRIEF DESCRIPTION OF THE DRAWINGS

The embodiments of the disclosure will be understood and appreciated more fully from the following detailed description, taken in conjunction with the drawings in which:

FIG. 5 illustrates an example of a method;

DETAILED DESCRIPTION

Figure 1:
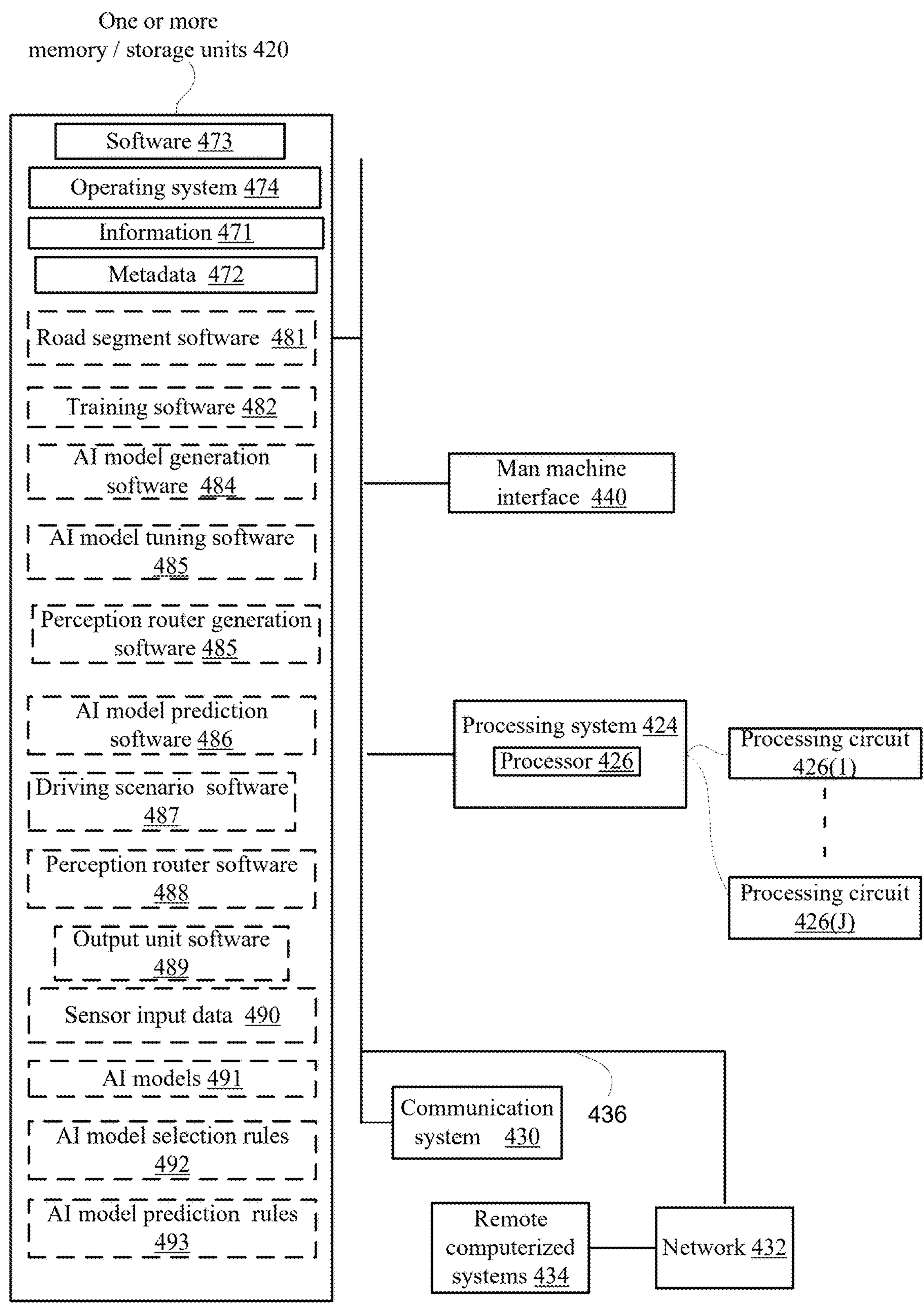
FIG. 1 illustrates an example of a computerized system.

The different figures illustrates examples of units and/or software and/or information items and/or steps and/or components. These examples are provided for the brevity of explanation. At least one of the units and/or software and/or information items and/or steps and/or components is optional or mandatory.

The term obtaining include receiving and/or generating.

According to an embodiment a scenario (such as a driving scenario) includes at least one of (a) one or more weather conditions, (b) one or more contextual parameters, (c) a road condition, (d) a traffic parameter. Various examples of a road condition may include the roughness of the road, the maintenance level of the road, presence of potholes or other related road obstacles, whether the road is slippery, covered with snow or other particles. Various examples of a traffic parameter and the one or more contextual parameters may include time (hour, day, period or year, certain hours at certain days, and the like), a traffic load, a distribution of vehicles on the road, the behavior of one or more vehicles (aggressive, calm, predictable, unpredictable, and the like), the presence of pedestrians near the road, the presence of pedestrians near the vehicle, the presence of pedestrians away from the vehicle, the behavior of the pedestrians (aggressive, calm, predictable, unpredictable, and the like), risk associated with driving within a vicinity of the vehicle, complexity associated with driving within of the vehicle, the presence (near the vehicle) of at least one out of a kindergarten, a school, a gathering of people, and the like. A contextual parameter may be related to the context of the sensed information—context may be depending on or relating to the circumstances that form the setting for an event, statement, or idea.

AI stands for artificial intelligence. In some of the figures and for brevity of explanation the artificial intelligence models are referred to as AI models.

According to an embodiment, there is provided a solution that is responsive to a scenario and may also be responsive to a combination of a scenario and a road segment in which the vehicle is located.

According to an embodiment, artificial intelligence models implement skills that are dynamically learnt.

According to an embodiment, an artificial intelligence model is associated with a single scenario, different artificial intelligence model are associated with different scenarios.

According to an embodiment, a single scenario is associated with one or more artificial intelligence models.

According to an embodiment an artificial intelligence model that is associated with a certain scenario is trained to provide a first decision making when fed with a certain scenario identifier and to provide a second decision making when fed with the certain scenario identifier and a road segment identifier, wherein the second decision making is more fine-tuned than the first decision making.

According to an embodiment, an artificial intelligence model is associated with a scenario and is fine-tuned to some road segments and not fine-tuned in other road segments.

According to an embodiment, the artificial intelligence model associated with a scenario is not fine-tuned to any road segment.

According to an embodiment, the artificial intelligence model associated with a scenario is prompt trained.

According to an embodiment, the artificial intelligence model is a transformer.

According to an embodiment, there is provided a solution that trains artificial intelligence model to be responsive to a scenario and may also be responsive to a combination of a scenario and a road segment in which the vehicle is located.

According to an embodiment, the solution trains artificial intelligence models to implement skills that are dynamically learnt.

According to an embodiment, the solution trains an artificial intelligence model to be associated with a single scenario, and train different artificial intelligence model to be associated with different scenarios.

According to an embodiment the solution trains an artificial intelligence model that is associated with a certain scenario to provide a first decision making when fed with a certain scenario identifier and to provide a second decision making when fed with the certain scenario identifier and a road segment identifier, wherein the second decision making is more tuned than the first decision making.

According to an embodiment, the solution trains an artificial intelligence model to be associated with a scenario and to be tuned to some road segments and not tuned in other road segments.

According to an embodiment, the solution trains at least one artificial intelligence model that associated with a scenario to not be tuned to any road segment.

According to an embodiment, the solution prompt-trains at least one artificial intelligence model associated with a scenario.

According to an embodiment there is provided a perception router that is configured to activate one or more artificial intelligence model based on a detected scenario. An example of a perception unit is illustrated in U.S. patent application Ser. No. 18/459,414 which is incorporated herein by reference. It should be noted that the multi-dimensional selection illustrated in said application is applicable mutatis mutandis to a single dimension selection made by the perception router—see also for example U.S. patent application Ser. No. 18/036,150 which is also incorporated herein by reference.

According to an embodiment there is provided a solution for predicting activated artificial intelligence models.

According to an embodiment the prediction is used for populating a cache memory and accurate prediction speed the response time and reduce the transfer of information to the cache memory.

According to an embodiment, the prediction is used for enriching a mapping between road segments and artificial intelligence models associated with the road segment.

According to an embodiment the prediction is based on cross-statistical data related to activation of artificial intelligence models in association with different road segments.

FIG. 1 illustrates an example of a computerized system 400.

Computerized system 400 includes a man machine interface 440 having or being in communication with man machine interface (MMI) controller (not shown), a communication system 430, one or more memory and/or storage units 420, a processing system 424 including processor 426. The computerized system may be a server, a laptop, a desktop or any other computer and may include or be in communication with a sensing unit and/or a controller.

According to an embodiment, computerized system 400 is in communication with network 432 and one or more other remote computerized systems 434 that are in communication with network 432. An example of a remote computerized system is a vehicle (such as vehicle 300 of FIG. 2), a server or one or more computers having access to a storage system.

According to an embodiment, the communication system 430 is configured to enable communication between the one or more memory and/or storage units 420 and/or any one of the additional units and/or the network 432 (that is in communication with the remote computerized systems). Communication system 430 is also configured to enable communication with other elements such as man machine interface 440.

The memory and/or storage units 420 was shown as storing software. Any reference to software should be applied mutatis mutandis to code and/or firmware and/or instructions and/or commands, and the like.

Processor 426 includes a plurality of processing units 426(1)-426(J), J is an integer that exceeds one. Any reference to one unit or item should be applied mutatis mutandis to multiple units or items. For example—any reference to processor should be applied mutatis mutandis to multiple processors, any reference to communication system 430 should be applied mutatis mutandis to multiple communication systems.

According to an embodiment, the one or more memory and/or storage units 420 includes one or more memory unit, each memory unit may include one or more memory banks.

According to an embodiment, the one or more memory and/or storage units 420 includes a volatile memory and/or a non-volatile memory. The one or more memory and/or storage units 420 may be a random-access memory (RAM) and/or a read only memory (ROM).

According to an embodiment, the non-volatile memory unit is a mass storage device, which can provide non-volatile storage of computer code, computer readable instructions, data structures, program modules, and other data for the processor or any other unit of vehicle. For example, and not meant to be limiting, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any content may be stored in any part or any type of the memory and/or storage units.

According to an embodiment, the at least one memory unit stores at least one database—such as any database known in the art—such as DB2®, Microsoft® Access, Microsoft® SQL Server, Oracle®, mySQL, PostgreSQL, and the like.

The memory and/or storage units 420 are configured to store firmware and/or software, one or more operating systems, data and metadata required to the execution of any of the methods mentioned in this application.

The memory and/or storage units 420 was shown as storing software. Any reference to software should be applied mutatis mutandis to code and/or firmware and/or instructions and/or commands, and the like.

Various units and/or components are in communication with each other using any communication elements and/or protocols. An example of a communication system is denoted 430. Other communication elements may be provided.

The communication system 430 may be in communication with bus 436. The bus represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus, and all buses specified in this description can also be implemented over a wired or wireless network connection and each of the subsystems.

Network 432 that is located outside the computerized system and is used for communication between the computerized system and at least one remote computing system and/or one or more vehicles. By way of example, a remote computing system can be a personal computer, a laptop computer, portable computer, a server, a router, a network computer, a peer device or other common network node, and so on. Logical connections between the processor and either one of remote computing systems can be made via a local area network (LAN) and a general wide area network (WAN). Such network connections can be through a network adapter (may belong to communication system 430) which can be implemented in both wired and wireless environments. Such networking environments are conventional and commonplace in offices, enterprise-wide computer networks, intranets, and a larger network such as the internet.

It should be noted that at least a part of the content illustrated as being stored in one or more memory/storage units 420 may be stored outside the computerized system. It should also be noted that the processor may evaluate signatures generated by a plurality of detectors.

Examples of generating signatures and/or cropping images are provided in U.S. patent application Ser. No. 18/527,701 which is incorporated herein by reference.

According to an embodiment, the memory and/or storage units 420 stores at least one of operating system 474, information 471, metadata 472, and software 473.

Examples of software include at least one of road segment behavioral software 481 (for generating special-purpose data reflecting behavioral data of drivers captured along one or more road segment—being used, for example, in step 720 of FIG. 5), training software 482 (for training—for example during method 700 of FIG. 5), artificial intelligence (AI) model generation software 484 for generating artificial intelligence models—for example by training), artificial intelligence model tuning software (for performing the one or more special-purpose learning of the artificial intelligence models—see step 720 of method 700), perception router generation software 485—for used in generating the perception router (see perception router 640 of FIG. 4), artificial intelligence model prediction software 486—for predicting a selection or more or more artificial intelligence models based on a current selection of one or more other artificial intelligence models, driving scenario software 487 for identifying a driving scenario (see, for example step 515 of method 500 of FIG. 6), perception router software 488 for implementing the functionality of the perception router, and output unit software 489 for implementing the output unit that follows the e.

Only one or some of these software may be stored in the one or more memory/storage units 420. There may be an overlap between the functionality of one or more of these software.

Examples of information and/or metadata include at least one of sensor input data 490, artificial intelligence models 491, artificial intelligence model selection rules 495 to be applied by the perception router, and artificial intelligence prediction rules 493. Only one or some of these information and/or metadata may be stored in the one or more memory/storage units 420.

By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by a computer.

Any content may be stored in any part or any type of memory and/or storage units.

According to an embodiment, at least one memory unit stores at least one database—such as any database known in the art—such as DB2®, Microsoft® Access, Microsoft® SQL Server, Oracle®, mySQL, PostgreSQL, and the like.

Various units and/or components are in communication with each other using any communication elements and/or protocols. An example of a communication system is denoted 430. Other communication elements may be provided.

According to an embodiment, processing system 424 is configured to perform method 700 while executing software.

According to an embodiment, processing system 424 is configured to perform at least one of the following when executing software:

- Perform a scenario-level learning of an artificial intelligence model by using sensed data captured in the environment of a vehicle, to provide a scenario-level decision making in accordance with a driving scenario.
- Perform a special-purpose learning of the artificial intelligence model, by collecting special-purpose data relating directly to a road segment indication of a road segment in a driving path of the vehicle, and feeding the artificial intelligence model with the collected special-purpose data, wherein the special-purpose data reflecting behavioral data of drivers captured along the road segment; and incorporate the special-purpose learning of the artificial intelligence model with the scenario-level learning, to provide a special-purpose decision making that is adaptive to the road segment indication, in accordance with the driving scenario.

Figure 2:
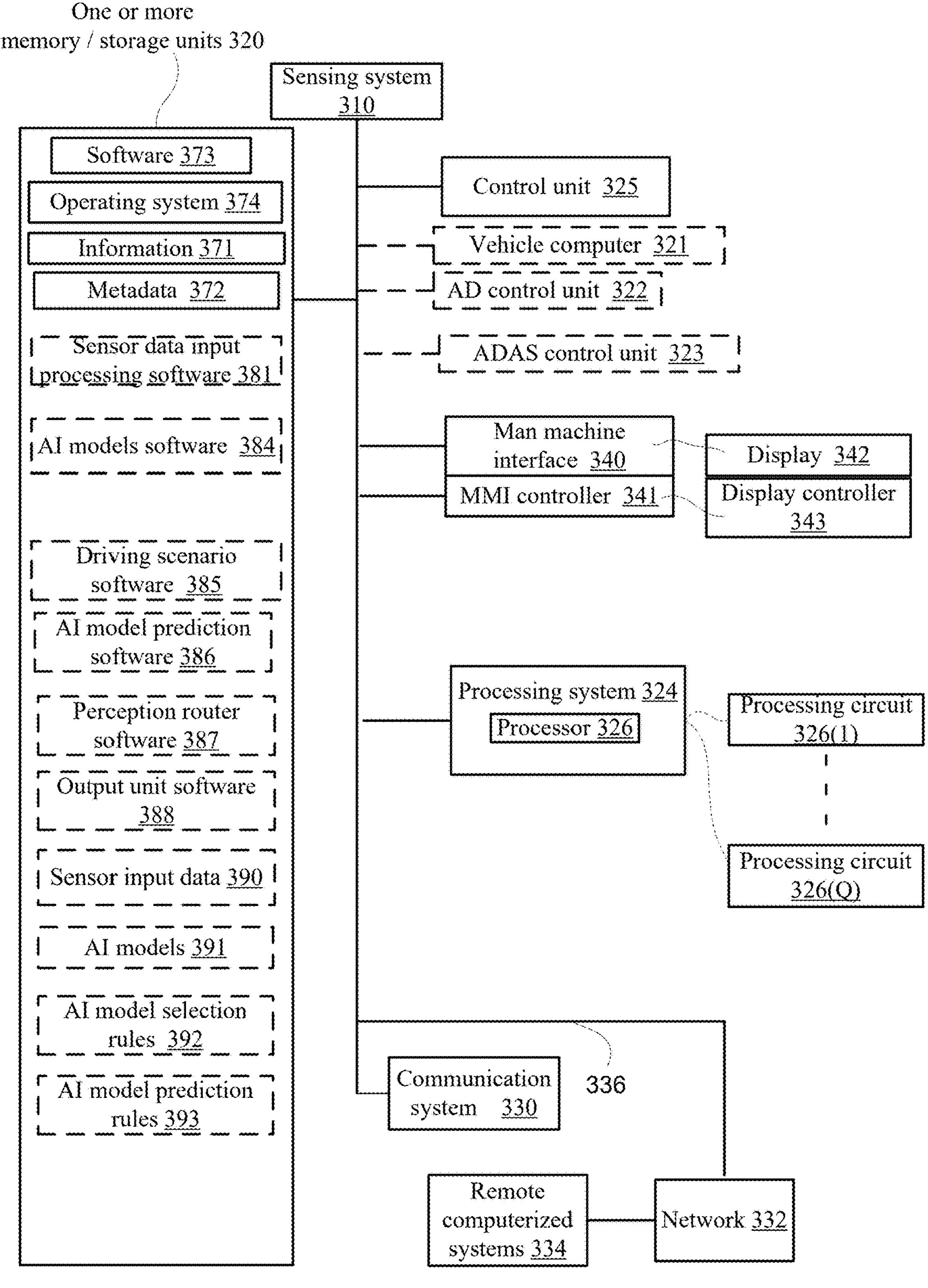
FIG. 2 illustrates an example of a vehicle.

FIG. 2 illustrates an example of vehicle 300.

Vehicle 300 includes a man machine interface 340 having or being in communication with man machine interface (MMI) controller 341, wherein in FIG. 1 the MMI is a display 342 or includes a display 342 and the MMI controller is a display controller 343 or includes the display controller 343, a communication system 330, one or more memory and/or storage units 320, a processing system 324 including processor 326. The communication system 330, the one or more memory and/or storage units 320, and the processing system 324 may belong to a computerized system of vehicle 300. The computerized system may be a server, a laptop, a desktop or any other computer and may include or be in communication with a sensing unit and/or a controller.

According to an embodiment, vehicle 300 is in communication with network 332 and one or more other remote computerized systems 334 that are in communication with network 332. An example of a remote computerized system is a server or one or more computers having access to a storage system that stores items related to one or more portions of one or more groups of neural networks—at least some of which are not currently stored in the vehicle.

According to an embodiment, the communication system 330 is configured to enable communication between the one or more memory and/or storage units 320 and/or any one of the additional units and/or the network 332 (that is in communication with the remote computerized systems). Communication system 330 is also configured to enable communication with other elements such as sensing system 310, man machine interface 340, control unit 325, vehicle computer 321, autonomous driving control unit 322 (denoted AD control unit), advanced driver assistance system (ADAS) control unit 323 (denoted ADAS control unit), and the like.

The memory and/or storage units 320 was shown as storing software. Any reference to software should be applied mutatis mutandis to code and/or firmware and/or instructions and/or commands, and the like.

Processor 326 includes a plurality of processing units 326(1)-326(Q), Q is an integer that exceeds one. Any reference to one unit or item should be applied mutatis mutandis to multiple units or items. For example—any reference to processor should be applied mutatis mutandis to multiple processors, any reference to communication system 330 should be applied mutatis mutandis to multiple communication systems.

According to an embodiment, the one or more memory and/or storage units 320 includes one or more memory unit, each memory unit may include one or more memory banks.

Any reference to memory and/or storage units 420 should be applied mutatis mutandis to one or more memory and/or storage units 320.

Any reference to communication system 430 should be applied mutatis mutandis to communication system 330.

Any reference to bus 436 should be applied mutatis mutandis to bus 336.

Any reference to network 432 should be applied mutatis mutandis to network 332.

According to an embodiment, the memory and/or storage units 320 stores at least one of: operating system 374, information 371, metadata 372, and software 373.

According to an embodiment, the memory and/or storage units 420 stores at least one of operating system 474, information 471, metadata 472, and software 473.

Figure 6:
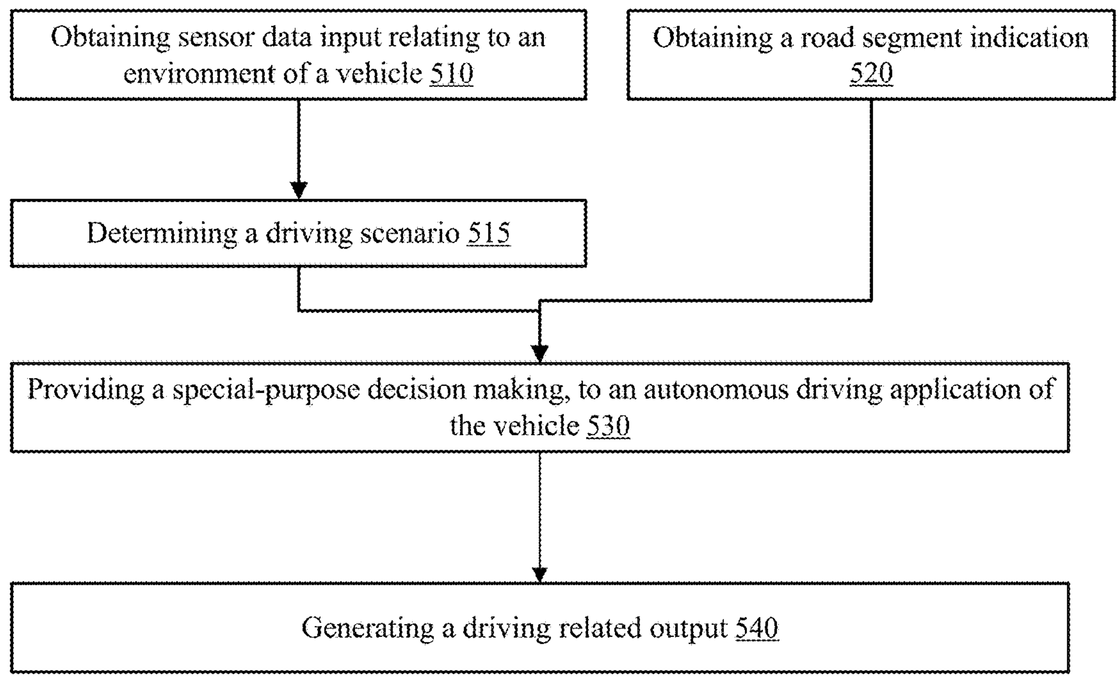
FIG. 6 illustrates examples of a method.

Examples of software include at least one of sensor data input processing software 381 (for processing the sensor input data—for example for determining the driving scenario—see step 515 of method 500 of FIG. 6), artificial intelligence model software for implementing the artificial intelligence models, driving scenario software 385 for determining the driving scenario based on the sensor input data (see, for example step 515 of method 500 of FIG. 6), artificial intelligence model prediction software 386—for predicting a selection or more or more artificial intelligence models based on a current selection of one or more other artificial intelligence models, perception router software 387 for implementing the functionality of the perception router, output unit software 388 for implementing the output unit that follows the artificial intelligence models.

Only one or some of these software may be stored in the one or more memory/storage units 320. There may be an overlap between the functionality of one or more of these software.

Examples of information and/or metadata include at least one or more of sensor input data 390, artificial intelligence models 391 (for example weights required for implementing the artificial intelligence models), artificial intelligence model selection rules 392 to be applied by the perception router, and artificial intelligence prediction rules 393. Only one or some of these information and/or metadata may be stored in the one or more memory/storage units 320.

The control unit 325 may cooperate with ADAS control unit 323 and/or with AD control unit 322 and/or may control or communicate with other vehicle components—including vehicle computer.

The ADAS control unit 323 is configured to control ADAS operations.

The AD control unit 322 is configured to control autonomous driving of the autonomous vehicle.

The vehicle computer 321 is configured to control the operation of the vehicle—especially controlling the engine, the transmission, and any other vehicle system or component.

The vehicle computer 321 may be in communication with an engine control module, a transmission control module, a powertrain control module, and the like.

The sensing system 310 may include optics, a sensing element group, a readout circuit, and an image signal processor. Optics are followed by a sensing element group such as line of sensing elements or an array of sensing elements that form the sensing element group. The sensing element group is followed by a readout circuit that reads detection signals generated by the sensing element group. An image signal processor is configured to perform an initial processing of the detection signals—for example by improving the quality of the detection information, performing noise reduction, and the like. The sensing system 310 is configured to output one or more sensed information units (SIUs) such as images, frames, audio segments, and any segment of unit of any sensed information unit.

Control unit 325 is configured to control the operation of the sensing system 310, and/or the one or more memory and/or storage units 320 and/or the one or more additional units (except the controller).

By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by a computer.

Any content may be stored in any part or any type of memory and/or storage units.

According to an embodiment, at least one memory unit stores at least one database—such as any database known in the art—such as DB2®, Microsoft® Access, Microsoft® SQL Server, Oracle®, mySQL, PostgreSQL, and the like.

Various units and/or components are in communication with each other using any communication elements and/or protocols. An example of a communication system is denoted 330. Other communication elements may be provided.

According to an embodiment, processing system 324 is configured to perform method 500, while executing software.

According to an embodiment, processing system 324 is configured to perform, while executing software:

- Obtain sensor data input relating to an environment of a vehicle.
- Determine a driving scenario, based on the sensor input data;
- Obtain a road segment indication that is indicative of a road segment being approached by the vehicle.
- Provide a special-purpose decision making, to an autonomous driving application of the vehicle, that is adaptive to the road segment indication and further in accordance with the driving scenario faced by the vehicle, wherein an artificial intelligence model associated with the special-purpose decision making, is trained, in a scenario-level learning by using sensed data captured in the environment of the vehicle, to provide a scenario-level decision making in accordance with the driving scenario, and further, by collecting special-purpose data relating directly to the road segment indication and reflecting behavioral data of drivers captured along the road segment, to provide a special-purpose decision making that is adaptive to the road segment indication, in accordance with the driving scenario.

Figure 3:
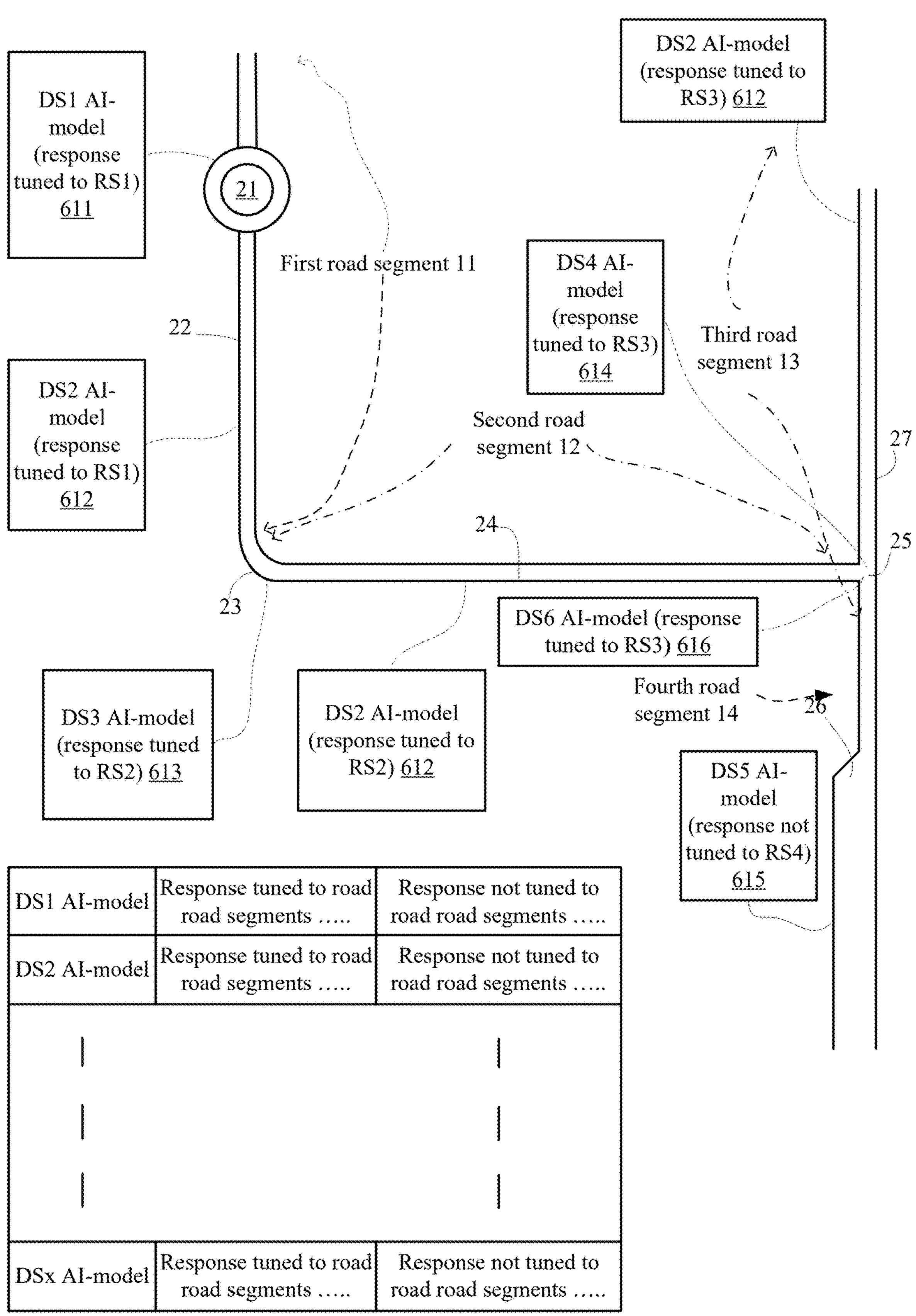
FIG. 3 illustrates an example of a road segments and artificial intelligence model capabilities.

FIG. 3 illustrates an example of a road segments and artificial intelligence model capabilities.

Table 600 maps each artificial intelligence model (referred to as DS AI-model) and its associated fine tuning— especially in which road segments the response of the artificial intelligence model is tuned to the road segments, and in which road segments the response is not tuned to the road segments.

The road segment includes first road segment 11 (RS1) (that includes roundabout 21 and a straight lane 22), second road segment 12 (RS2) (that includes a curve 24 and a straight lane 24), third road segment 13 (RS3) (that includes T-junction 25 and straight lane 27) and fourth road segment 14 (RS4) (that includes a road broadening section 26).

FIG. 3 illustrates six scenarios—first scenario (DS1) is a roundabout, second scenario (DS2) is a straight lane 24, a third scenario (DS3) is a curve, a fourth scenario (DS4) is a T-junction and a fifth scenario (DS5) is a road broadening section.

FIG. 3 also illustrates that the following artificial intelligence models are selected—and whether their response is tuned or not:

i. Approaching roundabout 21—selecting DS1 AI-module 611 having a response tuned to the first road segment (RS1).

ii. Approaching straight lane 22—selecting DS2 AI-module 612 having a response tuned to the first road segment (RS1).

iii. Approaching curve 23—selecting DS3 AI-module 613 having a response tuned to the second road segment (RS2).

iv. Approaching straight lane 24—selecting DS2 AI-module 612 having a response tuned to the second road segment (RS2).

v. Approaching T-junction 25—selecting DS4 AI-module 614 having a response tuned to the third road segment (RS3) and selecting DS6 AI-module 616 having a response tuned to the third road segment (RS3).

vi. Approaching road broadening section 26—selecting DS5 AI-model 615 that does not have a response tuned to the fourth road segment (RS4).

vii. Approaching straight lane 27—selecting DS2 AI-model 612 having a response tuned to the fourth road segment (RS4).

It should be noted that more than a single artificial intelligence model may be selected per scenario—as illustrated by the selection of DS4 AI-model 614 and DS6 AI-model 616 when approaching the T-junction.

These artificial intelligence models are associated with different scenarios that differ from each other by at least one of (a) one or more weather conditions, (b) one or more contextual parameters, (c) a traffic parameter.

Both scenarios involve approaching the T-junction. For example—one of the artificial intelligence models is associated with a given lighting condition (for example approaching a T-junction that is being strongly illuminated while the other artificial intelligence models is associated with another lighting condition or is ignorant to the lighting condition.

According to an embodiment, the mapping between a scenario and the one or more selected (activated) artificial intelligence models may be fixed or be updated and/or may be used by the perception router. A selection, by a perception router by of more than one or more artificial intelligence models per scenario is illustrated in U.S. patent application Ser. No. 18/459,414 which is incorporated herein by reference.

Figure 4:
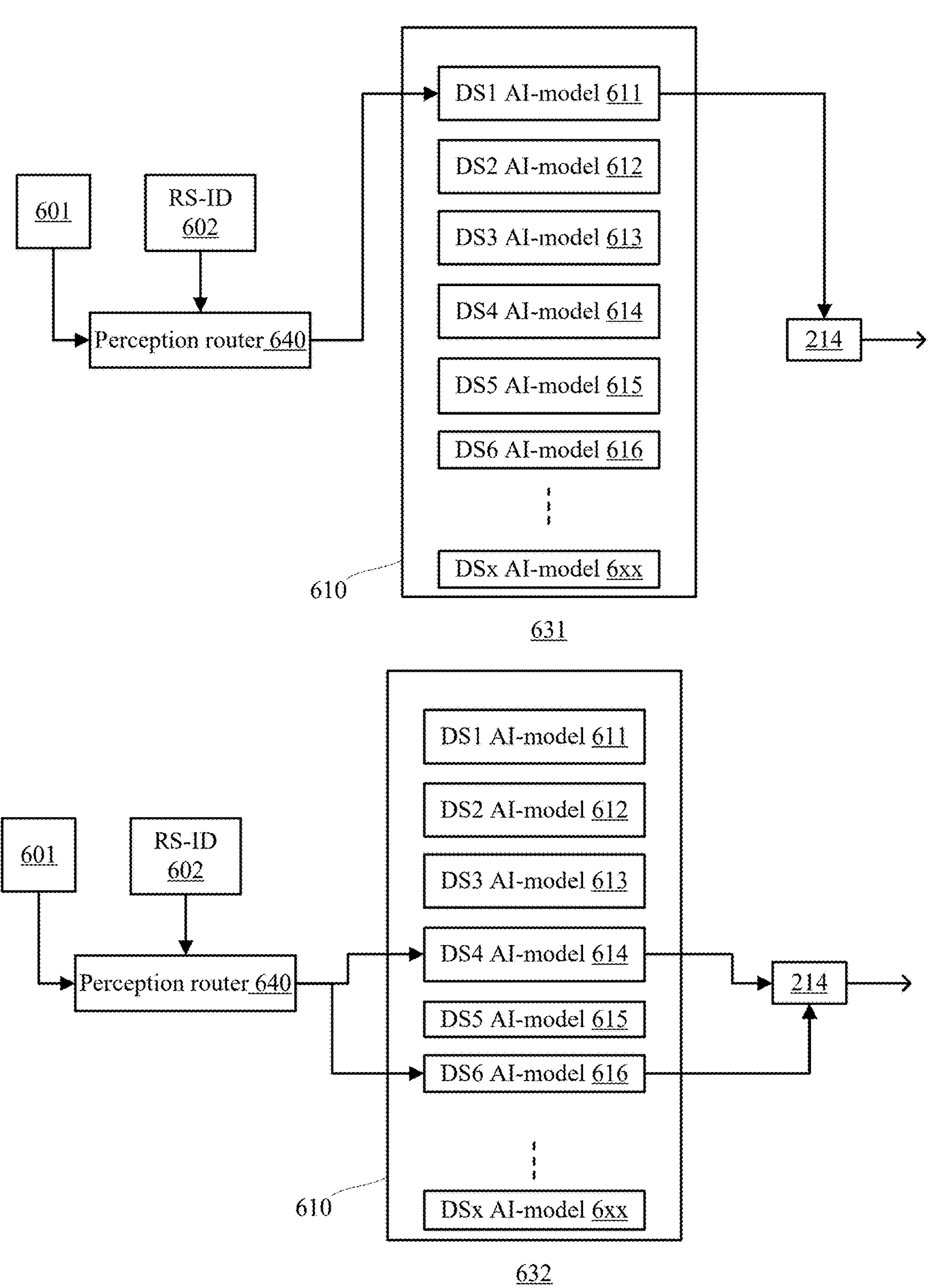
FIG. 4 illustrates examples of inference.

FIG. 4 illustrates an example of sensor data input 601, road segment identifier (RS-ID) 602.

Perception router 640 is fed by sensor data input 601 and RS-ID 602, and selects one or more artificial intelligence models of a group or an ensemble of artificial intelligence models (collectively denoted 610) that includes DS1 AI-model 611 till DSx AI-model 6*xx*.

The one or more outputs of the one or more selected artificial intelligence models are fed to output unit 214 that is configured to output a driving related decision—which may be more complex when more than a single artificial intelligence related agent is concurrently activated. The output unit operates according to defined rules such as outputting the output of a single selected artificial intelligence model, or apply a selection rule when more than a single artificial intelligence model is selected, apply a function on multiple outputs of concurrently selected artificial intelligence models—for example a weighted average, a selection of the safest output (for example with the minimal acceleration), applying one or more functions (for example—predefined and/or learnt and/or change over time), and/or applying one or more policies on the one or more artificial intelligent models. An example of a policy—attempting to reduce risk or complying with traffic regulations.

FIG. 4 illustrates phases (i) and (v) mentioned above—first selecting (see example 631) DS1 AI-model 611 having a response tuned to the first road segment, and then selecting (see example 632) DS4 AI-model 614 and DS6 AI-model 616 having corresponding responses tuned to the fourth road segment.

FIG. 5 illustrates an example of method 700 of adaptive learning of artificial intelligence models by localization.

According to an embodiment, method 700 includes step 710 of performing a scenario-level learning of an artificial intelligence model by using sensed data captured in the environment of a vehicle, to provide a scenario-level decision making in accordance with a driving scenario.

According to an embodiment, method 700 includes step 720 of performing a special-purpose learning of the artificial intelligence model, by collecting special-purpose data relating directly to a road segment indication of a road segment in a driving path of the vehicle, feeding the artificial intelligence model with the collected special-purpose data, wherein the special-purpose data reflecting behavioral data of drivers captured along the road segment, and incorporating the special-purpose learning of the artificial intelligence model with the scenario-level learning, to provide a special-purpose decision making that is adaptive to the road segment indication, in accordance with the driving scenario.

According to an embodiment, step 710 includes performing one or more scenario-level learning of one or more artificial intelligence models by using sensed data captured in the environment of a vehicle, to provide one or more scenario-level decision making in accordance with one or more driving scenarios.

According to an embodiment, step 720 includes performing one or more special-purpose learning of the one or more artificial intelligence models, by collecting one or more special-purpose data relating directly to one or more road segment indication of one or more road segments in a driving path of the vehicle, feeding the one or more artificial intelligence model with the one or more collected special-purpose data, wherein the one or more special-purpose data reflecting behavioral data of drivers captured along the one or more road segment, and incorporating the one or more special-purpose learning of the one or more artificial intelligence model with the one or more scenario-level learning, to provide one or more special-purpose decision making that is adaptive to the one or more road segment indication, in accordance with the one or more driving scenario.

According to an embodiment, step 710 includes at least one of:

- Performing a scenario-level learning of an artificial intelligence model by using sensed data captured in the environment of a vehicle, to provide a scenario-level decision making in accordance with a driving scenario.
- Performing an additional scenario-level learning of an additional artificial intelligence model by using sensed data captured in the environment of the vehicle, in accordance with an additional driving scenario.
- Training at least a first head of a neural network implementing the artificial intelligence model to provide the scenario-level decision making in accordance with the driving scenario.
- Storing first artificial intelligence model weights associated with the scenario-level decision making. The weights may be stored in a cache memory.

According to an embodiment, step 720 includes at least one of:

- Performing a special-purpose learning of the artificial intelligence model, by collecting special-purpose data relating directly to a road segment indication of a road segment in a driving path of the vehicle, feeding the artificial intelligence model with the collected special-purpose data, wherein the special-purpose data reflecting behavioral data of drivers captured along the road segment, and incorporating the special-purpose learning of the artificial intelligence model with the scenario-level learning, to provide a special-purpose decision making that is adaptive to the road segment indication, in accordance with the driving scenario.
- Incorporating, in a training of the additional artificial intelligence model, the special-purpose learning of the additional artificial intelligence model with the additional scenario-level learning of the additional artificial intelligence model, to provide an additional special-purpose decision making that is adaptive to the road segment indication, in accordance with the additional driving scenario.
- Performing another special-purpose learning by collecting additional special-purpose data relating directly to an additional road segment indication of an additional road segment in the driving path of the vehicle, and feeding the artificial intelligence model with the additional collected special-purpose data, wherein the additional collected special-purpose data reflecting behavioral data of drivers captured along the additional road segment.
- Identifying an equivalent road segment that is associated with a same behavioral data of drivers as the behavioral data of drivers captured along the road segment; and associating the equivalent road segment with the special-purpose learning related to the road segment.
- Training at least a second head of the neural network to provide the special-purpose decision making that is adaptive to the road segment indication, in accordance with the driving scenario.
- Storing second artificial intelligence weights associated with the special-purpose decision making.

Examples of different trainings in relation to skills and/or road segments are illustrated in FIG. 3.

According to an embodiment, the road segment indication is obtained by means of localization.

According to an embodiment, the execution of steps 710 and 720 in relation to an artificial intelligence model amounts to training the artificial intelligence model to: (i) provide the scenario-level decision making in accordance with the driving scenario when provided with a driving scenario indication; and (ii) provide the special-purpose decision making that is adaptive to the road segment indication, in accordance with the driving scenario, when provided with the driving scenario indication and the road segment indication.

According to an embodiment, the first and second artificial intelligence weights are selectively fed to a processing circuit when implementing the artificial intelligence model.

According to an embodiment, step 720 includes retraining the entire artificial intelligence model or retraining only a part of the artificial intelligence model (for example freezing some of the weights of the artificial intelligence model).

According to an embodiment, step 720 includes training a head of a neural network implementing the artificial intelligence model or adding a head to the neural network.

According to an embodiment, step 720 includes fine tuning the artificial intelligence model.

According to an embodiment, step 720 includes prompt tuning the artificial intelligence model. According to an embodiment, prompt-tuning includes having the best cues, or front-end prompts, fed to the model to give it task-specific context. The prompts can be extra words introduced by a human, or artificial intelligence-generated numbers introduced into the model's embedding layer. While fine-tuning offers deep customization by adjusting a model's entire weight structure, prompt tuning allows for a more agile approach, tuning only the inputs to the model. According to an embodiment the prompt tuning does not change the weights of the artificial intelligence model and does not involve retraining.

According to an embodiment, the prompt tuning may include determining whether to provide to the artificial intelligence models a driving scenario indication before the road segment—or to provide to the artificial intelligence models the road segment indication before the driving scenario indication.

FIG. 6 illustrates an example of method 500 for providing adaptive decision making for autonomous driving applications.

According to an embodiment, method 500 starts by step 510 of obtaining sensor data input relating to an environment of a vehicle.

According to an embodiment, the sensor data input is sensed by one or more sensors related to one or more vehicles. A sensor related to a vehicle may belong to the vehicle, may be attached to the vehicle, may be spaced apart from the vehicle, may follow a movement of the vehicle, may not follow the movement of the vehicle, may be an aerial sensor, a satellite sensor, an airborne sensor, a ground sensor, and the like.

According to an embodiment, any sensor of the one or more sensors related to the one or more vehicles may be at least one of an image sensor, a non-image sensor, a visible light sensor, a sensor operating in one or more frequencies other than visible light, a radar, a sonar, a magnetometer, a LIDAR, an ultrasonic sensor, an infrared sensor, a near infrared sensor, a radiometer, a thermal sensor, a microwave sensor, a x-ray sensor, a gravitometer, an altimeter, a barometer, a synthetic-aperture radar, a monochromatic sensor, a passive sensor, an active sensor, a sensor for sensing an environment of the vehicle.

According to an embodiment, any sensor of the one or more sensors related to the one or more vehicles may be a vehicle sensor sensing a status of one or more vehicle component (engine, brakes, chassis, wheels, gear, driving wheel, clutch, shock absorber), a vehicle velocity sensor, a vehicle acceleration sensor, and the like.

According to an embodiment, step 510 is followed by step 515 of determining a driving scenario, based on the sensor input data.

According to an embodiment, method 500 also includes step 520 of obtaining a road segment indication that is indicative of a road segment being approached by the vehicle.

According to an embodiment, steps 515 and/or 520 are followed by step 530 of providing a special-purpose decision making, to an autonomous driving application of the vehicle, that is adaptive to the road segment indication and further in accordance with the driving scenario faced by the vehicle.

An artificial intelligence model associated with the special-purpose decision making, is trained, in a scenario-level learning by using sensed data captured in the environment of the vehicle, to provide a scenario-level decision making in accordance with the driving scenario, and further, by collecting special-purpose data relating directly to the road segment indication and reflecting behavioral data of drivers captured along the road segment, to provide a special-purpose decision making that is adaptive to the road segment indication, in accordance with the driving scenario.

For example—referring to FIG. 3—D S1 AI-model 611, DS2 AI-model 612, DS3 AI-model 613 and DS4 AI-model 614 have their response tuned to various road segments.

According to an embodiment, and as illustrated in FIG. 3—the road segments is a given road segment, the driving scenario is a given driving scenario, and the special-purpose decision making is associated with the given road segment.

According to an embodiment, the method further includes providing the special-purpose decision making that is associated with the given road segment, when the vehicle faces the given driving scenario and is at an equivalent road segment, the equivalent road segment differs by location from the given driving scenario and is associated with a same behavioral data of drivers as the behavioral data of drivers captured along the given road segment.

According to an embodiment, the method further includes providing an-other special-purpose decision making that is ignorant to behavioral data of drivers captured along an other road segment, when the vehicle faces the given driving scenario and the autonomous driving application of the vehicle was not trained using special-purpose data that reflects behavioral data of drivers captured along the other road segment.

According to an embodiment, the obtaining the road segment indication is by means of localization.

According to an embodiment, the obtaining the road segment indication involves interacting with a vehicle localization process.

According to an embodiment, step 530 is followed by step 540 of generating a driving related output.

Ther driving related output may be provided by one or more artificial intelligence model and/or by the output unit and/or by an application that is downstream to the output unit in the sense that the output of the output unit is provided to the application or is further processed before reaching the application.

According to an embodiment, the driving related output may be the outcome of the special-purpose decision making.

According to an embodiment, the driving related output includes at least one of:

- An instruction executable by a man machine interface controller, to provide a recommendation to a driver regarding a navigation of the vehicle.
- A request aimed to the man machine interface controller, to provide a recommendation to a driver regarding a navigation of the vehicle.
- An instruction executable by an autonomous control unit of the vehicle to perform an autonomous driving related operation such as autonomously changing a speed of the vehicle, autonomously changing an acceleration of the vehicle, autonomously changing an acceleration of the vehicle, autonomously changing a mode of operation of the vehicle.
- A request aimed to an autonomous control unit of the vehicle to perform an autonomous driving related operation such as autonomously changing a speed of the vehicle, autonomously changing an acceleration of the vehicle, autonomously changing an acceleration of the vehicle, autonomously changing a mode of operation of the vehicle.
- An instruction executable by a driver assistance control unit (such as but not limited to an ADAS control unit) of the vehicle to perform a driver assisting operation—such as suggesting to the driver a suggested path of progress, a suggested speed and/or acceleration and/or direction of the vehicle, or performing an autonomous braking operation or performing a lane maintenance operation of temporarily, during a short period, takeover the control of the vehicle, and the like.
- A request aimed to a driver assistance control unit (such as but not limited to an ADAS control unit) of the vehicle to perform a driver assisting operation—such as suggesting to the driver a suggested path of progress, a suggested speed and/or acceleration and/or direction of the vehicle, or performing an autonomous braking operation or performing a lane maintenance operation of temporarily, during a short period, takeover the control of the vehicle, and the like.
- An instruction executable by a computer vehicle related to a manner of operation of any component of the vehicle such as brakes, engine, and the like.
- A request sent to a computer vehicle related to a manner of operation of any component of the vehicle such as brakes, engine, and the like.
- Information about the environment of the vehicle.
- A prediction of a future path of the vehicle.
- A prediction of a behavior of one or more road element.
- An emergency alert.
- a Collision Alert.

According to an embodiment, the method includes outputting and/or transmitting an/or storing and/or instructing to respond to and/or triggering a response to and/or controlling a response to and/or performing a respond to any of the driving related output listed above and/or below.

According to an embodiment, the method includes generating and/or requesting and/or determining and/or instructing and/or triggering and/or controlling and/or transmitting and/or outputting and/or preforming at least one of a warning, an alert signal, a driving alert, an estimated future driving of the vehicle, an estimated future behavior (e.g. movement) of any road element, an autonomous driving operation, an driving assistance output, a prediction output with respect to the behavior (e.g. movement, etc) of the element in the environment—and/or in the environment with re to the vehicle, an operation and/or response in compliant with one or more levels of autonomous driving—such as L2, L2+, L2++, L3 or L4 autonomous driving.

The providing of the driving related output may include storing the driving related output at a location accessible to another unit controller, transmitting instructions of the driving related output to the other unit, sending an indication about the generation of the instructions of the driving related output to the other unit man machine interface controller.

According to an embodiment, the method may include outputting and/or transmitting an/or storing and/or instructing to respond to and/or triggering a response to and/or controlling a response to and/or performing a respond to any of the driving related output listed above and/or below.

Figure 7:
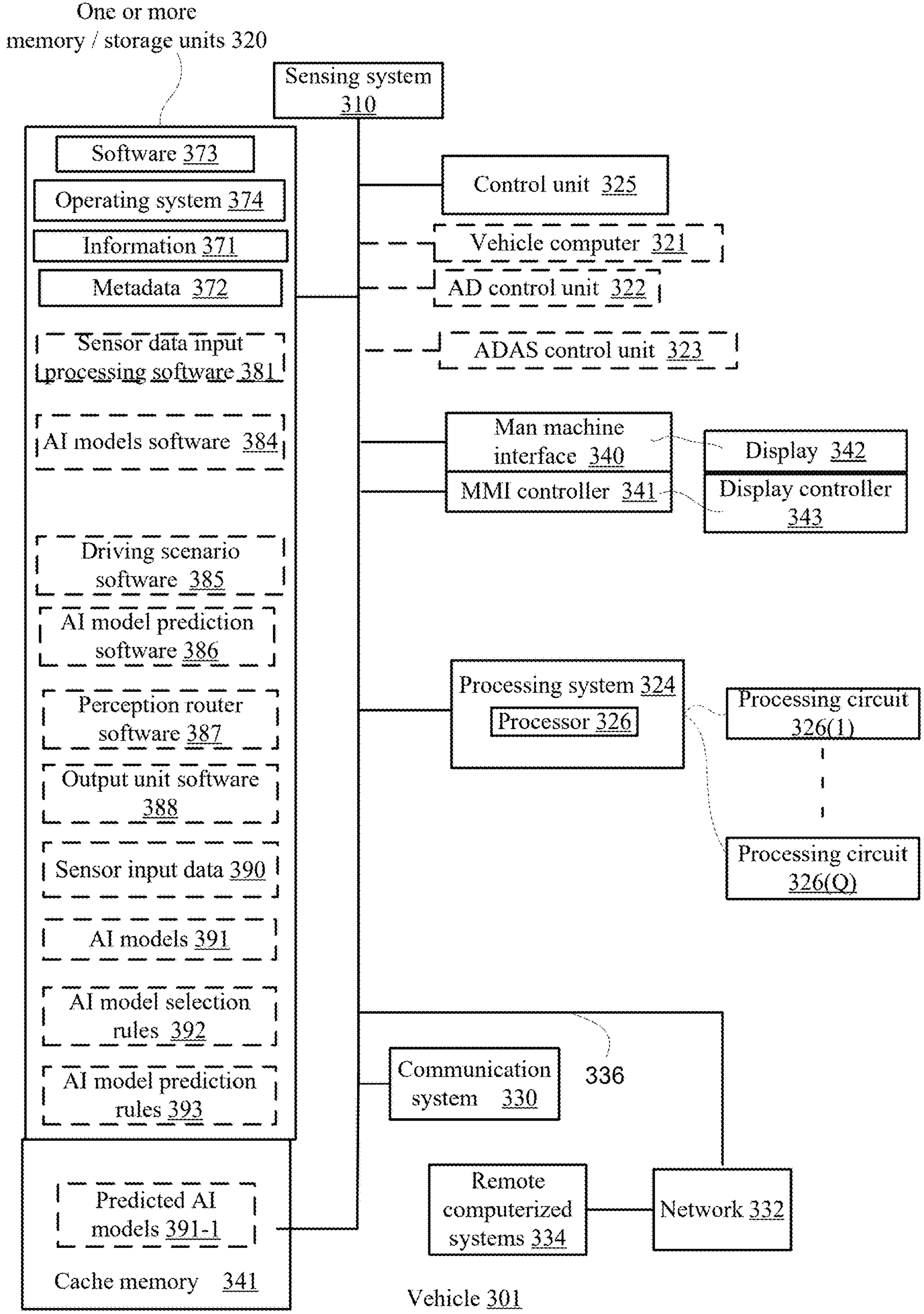
FIG. 7 illustrates an example of a vehicle.

FIG. 7 illustrates an example of vehicle 301 that includes MMI 340 having or being in communication with MMI controller 341, wherein in FIG. 7 the MMI is a display 342 or includes a display 342 and the MMI controller is a display controller 343 or includes the display controller 343, a communication system 330, one or more memory and/or storage units 320, a processing system 324 including processor 326.

In FIG. 7 the one or more memory and/or storage units 320 includes a cache memory 341 and one or more other memory/storage elements (that differ from the cache memory 341).

The communication system 330, the one or more memory and/or storage units 320, and the processing system 324 may belong to a computerized system of vehicle 301. The computerized system may be a server, a laptop, a desktop or any other computer and may include or be in communication with a sensing unit and/or a controller.

According to an embodiment, vehicle 301 is in communication with network 332 and one or more other remote computerized systems 334 that are in communication with network 332.

According to an embodiment, the communication system 330 is configured to enable communication between the one or more memory and/or storage units 320 (including the cache memory and one or more other memory/storage elements) and/or any one of the additional units and/or the network 332 (that is in communication with the remote computerized systems). Communication system 330 is also configured to enable communication with other elements such as sensing system 310, man machine interface 340, control unit 325, vehicle computer 321, autonomous driving control unit 322 (denoted AD control unit), advanced driver assistance system (ADAS) control unit 323 (denoted ADAS control unit), and the like.

The memory and/or storage units 320 was shown as storing software. Any reference to software should be applied mutatis mutandis to code and/or firmware and/or instructions and/or commands, and the like.

Processor 326 includes a plurality of processing units 326(1)-326(Q).

Any reference to memory and/or storage units 420 should be applied mutatis mutandis to one or more memory and/or storage units 320.

Any reference to communication system 430 should be applied mutatis mutandis to communication system 330.

Any reference to bus 436 should be applied mutatis mutandis to bus 336.

Any reference to network 432 should be applied mutatis mutandis to network 332.

According to an embodiment, the memory and/or storage units 320 stores at least one of: operating system 374, information 371, metadata 372, and software 373.

According to an embodiment, the memory and/or storage units 420 stores at least one of operating system 474, information 471, metadata 472, and software 473.

Examples of software include at least one of sensor data input processing software 381 (for processing the sensor input data—for example for determining the driving scenario—see step 515 of method 500 of FIG. 6), artificial intelligence model software for implementing the artificial intelligence models, driving scenario software 385 for determining the driving scenario based on the sensor input data (see, for example step 515 of method 500 of FIG. 6), artificial intelligence model prediction software 386—for predicting a selection or more or more artificial intelligence models based on a current selection of one or more other artificial intelligence models, perception router software 387 for implementing the functionality of the perception router, output unit software 388 for implementing the output unit that follows the artificial intelligence models.

Only one or some of these software may be stored in the one or more memory/storage units 320. There may be an overlap between the functionality of one or more of these software.

Examples of information and/or metadata include at least one or more of sensor input data 390, artificial intelligence models 391 (for example weights required for implementing the artificial intelligence models), artificial intelligence model selection rules 392 to be applied by the perception router, and artificial intelligence prediction rules 393. Only one or some of these information and/or metadata may be stored in the one or more memory/storage units 320.

In FIG. 7, the cache memory 341 stores predicted artificial intelligence models 391-1 (for example stores weights that represent the predicted artificial intelligence models) and the one or more other memory/storage elements store the artificial intelligence models.

According to an embodiment the connectivity of the artificial intelligence model is known and not need to be stored—but according to an embodiment the cache memory (and any other memory/storage unit) may also stores connectivity information regarding the connectivity associated with the artificial intelligence model.

The control unit 325 may cooperate with ADAS control unit 323 and/or with AD control unit 322 and/or may control or communicate with other vehicle components—including vehicle computer.

Figure 8:
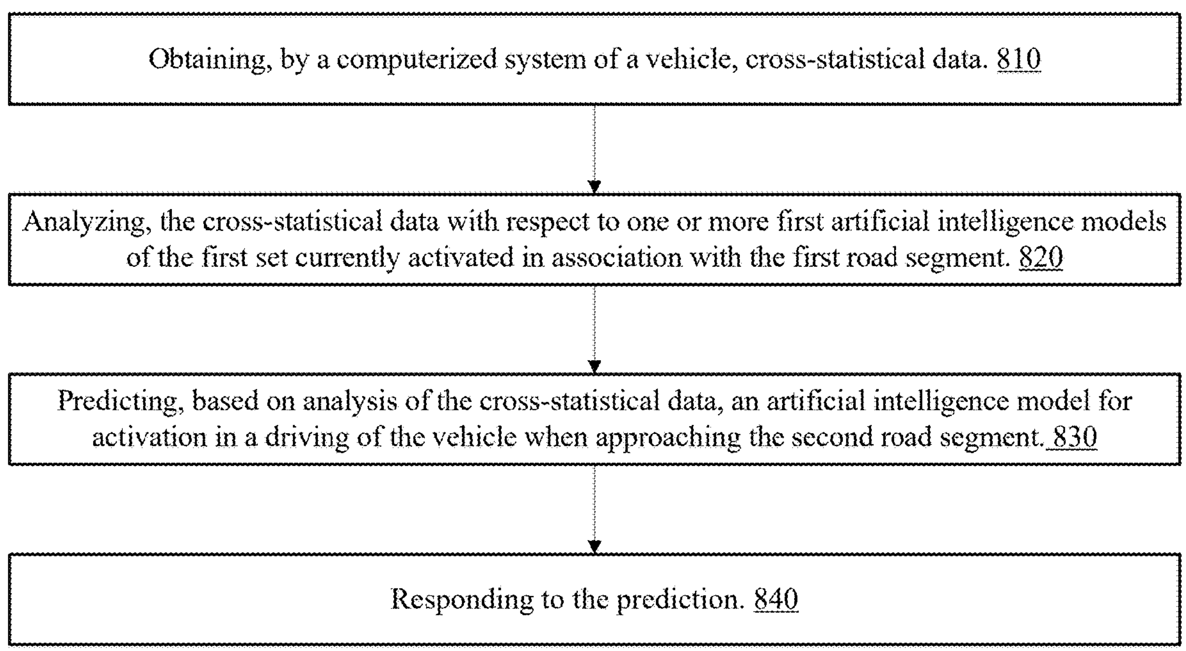
FIG. 8 illustrates an example of a method.

FIG. 8 illustrates an example of method 800 of predictability of artificial intelligence models for activation using localization.

According to an embodiment, method 800 includes step 810 of obtaining, by a computerized system of a vehicle, cross-statistical data relating to (a) an activation of a first set of artificial intelligence models, with an autonomous driving application, in association with a first road segment indication of a first road segment in a driving path of a vehicle and with respect to one or more first driving scenarios, and to (b) an activation of a second set of artificial intelligence models in association with a second road segment indication of a second road segment in the driving path of the vehicle and with respect to one or more second driving scenarios.

According to an embodiment, step 810 is followed by step 820 of analyzing, the cross-statistical data with respect to one or more first artificial intelligence models of the first set currently activated in association with the first road segment.

According to an embodiment, step 820 is followed by step 830 of predicting, based on analysis of the cross-statistical data, an artificial intelligence model for activation in a driving of the vehicle when approaching the second road segment.

According to an embodiment, the artificial intelligence models of the first set and of the second set are trained each (or at least some of the artificial intelligence models), in a scenario-level learning by using sensed data captured in the environment of the vehicle, to provide a scenario-level decision making in accordance with a driving scenario, and further, by collecting special-purpose data relating directly to a specified road segment indication and reflecting behavioral data of drivers captured along a specified road segment, to provide a special-purpose decision making that is adaptive to the specified road segment indication, in accordance with the driving scenario.

According to an embodiment, step 830 involves determining the artificial intelligence model for activation in the driving of the vehicle upon receiving the second road segment indication.

According to an embodiment, step 820 includes or is preceded by obtaining an indication regarding the currently activated one or more first artificial intelligence models of the first set. According to an embodiment, the indication is provided by a perception router or by another computerized unit that monitors the activation of the currently activated one or more first artificial intelligence models.

According to an embodiment, the predicted artificial intelligence model is of the second set of artificial intelligence models.

According to an embodiment, the predicted artificial intelligence model is not of the second set of artificial intelligence models. In this case the prediction may be used to enrich the artificial intelligence models associated with the second road segment. This case occurs, when there is not enough information regarding the second road segment.

According to an embodiment, step 810 includes:

Collecting first information regarding the activation of the first set of artificial intelligence models during a learning period.

Collecting second information regarding the activation of the second set of artificial intelligence models during the learning period.

Processing the first information in accordance with the second information to provide the cross-statistical data.

According to an embodiment, the learning period is of any duration—for example at least a day, at least a month, at least a year, and the like. A lengthier learning period may provide more accurate statistics—especially when the road segments remain unchanged.

According to an embodiment, the first information and/or the second information are gathered in relation to multiple vehicles.

According to an embodiment, the cross-statistical data represent patterns of activation of artificial intelligence models. For example—a cross-statistical data is proportional to the occurrence of a pattern that involves selecting a specific second artificial intelligence model after a given artificial intelligence model is selected.

According to an embodiment, steps 820 and/or step 830 are executed in a real time driving of the vehicle, with the activation of the first set of artificial intelligence models. According to an embodiment, real time means with a latency of a fraction of a second or up to a few seconds (few—for example between one and five) or at least fact enough to be completed before reaching the road segment.

According to an embodiment, the cross-statistical data is generated by applying a pattern analysis that is indicative of activation patterns of artificial intelligence models.

According to an embodiment, step 830 is followed by step 840 of responding to the prediction.

According to an embodiment, step 840 includes at least one of:

Uploading the predicted artificial intelligence model to a cache memory module of the vehicle, in association with the second road segment indication. If the prediction is accurate, the activation is faster and associated with fewer transfer of data to the cache memory.

Updating the cross-statistical data.

Validating the prediction when reaching the second road segment.

Sending to a computerized system allocated with generating the cross-statistical data an indication regarding the predicted artificial intelligence model and/or an accuracy of the prediction.

Updating statics of artificial intelligence model activated in relation to the second road segment.

Figure 9:
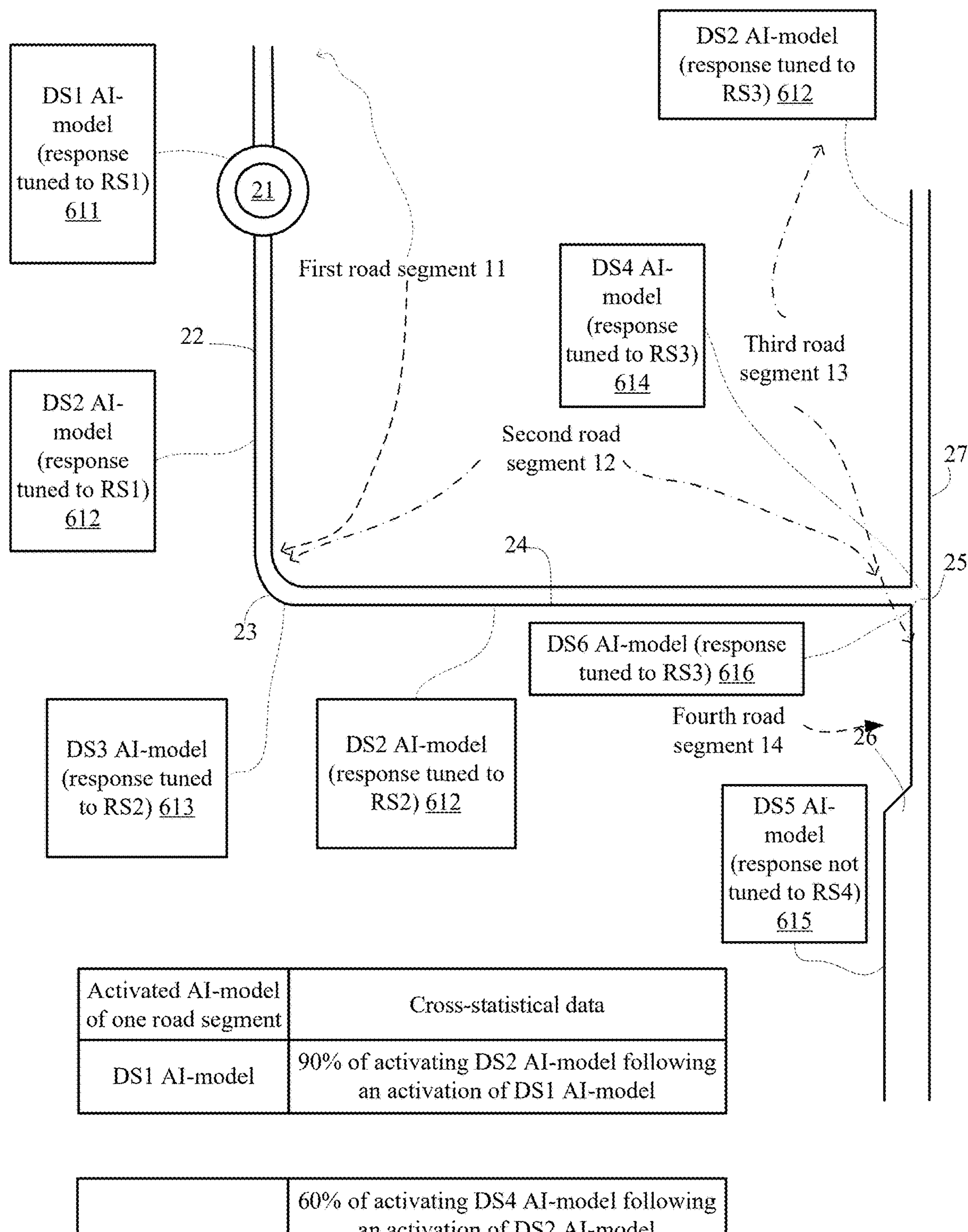
FIG. 9 illustrates an example of inference.

FIG. 9 illustrates an example of cross-statistical data and of inference.

FIG. 9 illustrates six scenarios—first scenario (DS1) is a roundabout, second scenario (DS2) is a straight lane 24, a third scenario (DS3) is a curve, a fourth scenario (DS4) is a T-junction and a fifth scenario (DS5) is a road broadening section.

FIG. 9 also illustrates examples of cross-statistical data. For example—when the activated AI-model of first road segment 11 is DS1 AI-model then according to the cross-statistical data there is a 90 percent chance that during the second road segment DS2 AI-model is activated—and DS2 AI-model is sent to the cache memory.

Yet for another example—when the activated AI-model of second road segment 12 is DS2 AI-model then according to the cross-statistical data there is a 60 percent chance that during the third road segment DS4 AI-model is activated and there is 40 percent chance that during the third road segment DS6 AI-model is activated—and both DS4 AI-model and DS6 AI-model are sent to the cache memory. According to an embodiment, one or more older AI model may be evacuated from the cache memory. According to an embodiment, the third road segment is associated with DS2 AI-model—which may not be evacuated form the cache memory.

Because some aspects of the illustrated embodiments of the present disclosure may, for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any combination of any steps of any method illustrated in the specification and/or drawings may be provided. Any combination of any subject matter of any of claims may be provided. Any combinations of systems, units, components, processors, sensors, illustrated in the specification and/or drawings may be provided. Any combination of any module or unit listed in any of the figures, any part of the specification and/or any claims may be provided.

Any reference in the specification to a method should be applied mutatis mutandis to a device or system capable of executing the method and/or to a non-transitory computer readable medium that stores instructions for executing the method. Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

In the foregoing specification, the invention has been described with reference to specific examples of embodiments of the invention. It will, however, be evident that various modifications and changes may be made therein without departing from the broader spirit and scope of the invention as set forth in the appended claims. The specifications and drawings are, accordingly, to be regarded in an illustrative rather than in a restrictive sense.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Those skilled in the art will recognize that boundaries between the above-described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Thus, the scope of the embodiments of the disclosure is defined by the appended claims and equivalents thereof. While certain features of the disclosure have been illustrated and described herein, many modifications, substitutions, changes, and equivalents will now occur to those of ordinary skill in the art. It is therefore to be understood that the appended claims are intended to cover all such modifications and changes as fall within the true spirit of the invention.

I claim:

1. A method of predictability of artificial intelligence models for activation using localization, the method comprises:

obtaining, by a computerized system of a vehicle, cross-statistical data relating to (a) an activation of a first set of artificial intelligence models, with an autonomous driving application, in association with a first road segment indication of a first road segment in a driving path of the vehicle and with respect to one or more first driving scenarios, and to (b) an activation of a second set of artificial intelligence models in association with a second road segment indication of a second road segment in the driving path of the vehicle and with respect to one or more second driving scenarios;

analyzing, the cross-statistical data with respect to one or more first artificial intelligence models of the first set currently activated in association with the first road segment; and predicting, based on analysis of the cross-statistical data, an artificial intelligence model for activation in a driving of the vehicle when approaching the second road segment;

wherein the artificial intelligence models of the first set and of the second set are trained each, in a scenario-level learning by using sensed data captured in an environment of the vehicle, to provide a scenario-level decision making in accordance with a driving scenario, and further, by collecting special-purpose data relating directly to a specified road segment indication and reflecting behavioral data of drivers captured along a specified road segment, to provide a special-purpose decision making that is adaptive to the specified road segment indication, in accordance with the driving scenario.

2. The method according to claim 1, wherein the predicting involves determining the artificial intelligence model for activation in the driving of the vehicle upon receiving the second road segment indication.

3. The method according to claim 1, further comprising obtaining an indication regarding the currently activated one or more first artificial intelligence models of the first set.

4. The method according to claim 1, wherein the predicted artificial intelligence model is of the second set of artificial intelligence models.

5. The method according to claim 1, wherein the obtaining of the cross-statistical data comprises:

collecting first information regarding the activation of the first set of artificial intelligence models during a learning period;

collecting second information regarding the activation of the second set of artificial intelligence models during the learning period; and processing the first information in accordance with the second information to provide the cross-statistical data.

6. The method according to claim 1, wherein the analyzing and the predicting are executed in a real time driving of the vehicle, with the activation of the first set of artificial intelligence models.

7. The method according to claim 1, wherein the cross-statistical is generated by applying a pattern analysis that is indicative of activation patterns of artificial intelligence models.

8. The method according to claim 1, further comprising uploading the predicted artificial intelligence model to a cache memory module of the vehicle, in association with the second road segment indication.

9. A system of predictability of artificial intelligence models for activation using localization, the system comprising at least one processing device configured to:

obtain cross-statistical data relating to (a) an activation of a first set of artificial intelligence models, with an autonomous driving application, in association with a first road segment indication of a first road segment in a driving path of a vehicle and with respect to one or more first driving scenarios, and to (b) an activation of a second set of artificial intelligence models in association with a second road segment indication of a second road segment in the driving path of the vehicle and with respect to one or more second driving scenarios;

analyze the cross-statistical data with respect to one or more first artificial intelligence models of the first set currently activated in association with the first road segment; and predict based on analysis of the cross-statistical data, an artificial intelligence model for activation in a driving of the vehicle when approaching the second road segment;

wherein the artificial intelligence models of the first set and of the second set are trained each, in a scenario-level learning by using sensed data captured in an environment of the vehicle, to provide a scenario-level decision making in accordance with a driving scenario, and further, by collecting special-purpose data relating directly to a specified road segment indication and reflecting behavioral data of drivers captured along a specified road segment, to provide a special-purpose decision making that is adaptive to the specified road segment indication, in accordance with the driving scenario.

10. The system according to claim 9, wherein the at least one processing device is further configured to upload the predicted artificial intelligence model to a cache memory module of the vehicle, in association with the second road segment indication.

11. A non-transitory computer readable medium of artificial intelligence models for activation using localization that stores instructions that, when executable by at least one processing device, cause the device to:

obtain cross-statistical data relating to (a) an activation of a first set of artificial intelligence models, with an autonomous driving application, in association with a first road segment indication of a first road segment in a driving path of a vehicle and with respect to one or more first driving scenarios, and to (b) an activation of a second set of artificial intelligence models in association with a second road segment indication of a second road segment in the driving path of the vehicle and with respect to one or more second driving scenarios;

analyze the cross-statistical data with respect to one or more first artificial intelligence models of the first set currently activated in association with the first road segment; and predict based on analysis of the cross-statistical data, an artificial intelligence model for activation in a driving of the vehicle when approaching the second road segment;

wherein the artificial intelligence models of the first set and of the second set are trained each, in a scenario-level learning by using sensed data captured in an environment of the vehicle, to provide a scenario-level decision making in accordance with a driving scenario, and further, by collecting special-purpose data relating directly to a specified road segment indication and reflecting behavioral data of drivers captured along a specified road segment, to provide a special-purpose decision making that is adaptive to the specified road segment indication, in accordance with the driving scenario.

12. The non-transitory computer readable medium according to claim 11, wherein the predicting involves determining the artificial intelligence model for activation in the driving of the vehicle upon receiving the second road segment indication.

13. The non-transitory computer readable medium according to claim 11, further storing instructions that, when executable by the at least one processing device, cause the device to obtain an indication regarding the currently activated one or more first artificial intelligence models of the first set.

14. The non-transitory computer readable medium according to claim 11, wherein the predicted artificial intelligence model is of the second set of artificial intelligence models.

15. The non-transitory computer readable medium according to claim 11, wherein the obtaining of the cross-statistical data comprises:

collecting first information regarding the activation of the first set of artificial intelligence models during a learning period;

collecting second information regarding the activation of the second set of artificial intelligence models during the learning period; and processing the first information in accordance with the second information to provide the cross-statistical data.

16. The non-transitory computer readable medium according to claim 11, wherein the analyzing and the predicting are executed in a real time driving of the vehicle, with the activation of the first set of artificial intelligence models.

17. The non-transitory computer readable medium according to claim 11, wherein the cross-statistical data is generated by applying a pattern analysis that is indicative of activation patterns of artificial intelligence models.

18. The non-transitory computer readable medium according to claim 11, further storing instructions that, when executable by the at least one processing device, cause the device to upload the predicted artificial intelligence model to a cache memory module of the vehicle, in association with the second road segment indication.

* * * * *